United States Patent
Berkelhammer et al.

[15] 3,674,780
[45] July 4, 1972

[54] NOVEL 2,5-DISUBSTITUTED THIAZOLE CARBOXALDEHYDE AND DERIVATIVES OF THE SAME

[72] Inventors: Gerald Berkelhammer, Princeton; Goro Asato, Titusville, both of N.J.; Edward Leslie Moon, St. Petersburg, Fla.

[73] Assignee: American Cyanamid Company, Stamford, Conn.

[22] Filed: Jan. 19, 1970

[21] Appl. No.: 4,049

Related U.S. Application Data

[63] Continuation-in-part of Ser. No. 598,209, Dec. 1, 1966, Pat. No. 3,505,346, which is a continuation-in-part of Ser. No. 515,442, Dec. 21, 1965, abandoned.

[52] U.S. Cl. .............................. 260/240 G, 71/90, 424/270, 260/302 R
[51] Int. Cl. ........................................................ C07d 91/32
[58] Field of Search ............................................. 260/240 G

[56] References Cited

UNITED STATES PATENTS 3,505,346  4/1970  Berkelhammer et al...............260/302

OTHER PUBLICATIONS

German Printed Application (Auslegeschrift) No. 1,159,450, published Dec. 19, 1963, 3 pages

*Primary Examiner*—John D. Randolph
*Attorney*—Robert P. Raymond

[57] ABSTRACT

The present invention relates to novel 2,5-disubstituted mononitro thiazoles and to methods for their preparation. These compounds are used for controlling or inhibiting the growth of microorganisms, fungi and nematodes.

4 Claims, No Drawings

NOVEL 2,5-DISUBSTITUTED THIAZOLE CARBOXALDEHYDE AND DERIVATIVES OF THE SAME

This application is a continuation-in-part of our copending application, Ser. No. 598,209, filed on Dec. 1, 1966, now U.S. Pat. No. 3,505,346, issued on Apr. 7, 1970, which is in turn a continuation-in-part of our copending application, Ser. No, 515,442, filed on Dec. 21, 1965, now abandoned.

The present invention relates to a novel class of 2,5-disubstituted thiazoles and to methods for their preparation. More specifically, the invention relates to substituted thiazole carboxaldehydes and derivatives thereof, to methods for preparing the same and has as a principal object thereof, the utilization for controlling or inhibiting the growth of microorganisms, fungi and nematodes.

The novel substituted thiazolecarboxaldehydes and derivatives thereof of this invention can be represented by the graphic structure:

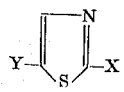

where X and Y each represents the substituent:

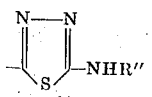

—NO₂, —CHO, —CH = NR or —CH = CHR' provided that X or Y but not both is —NO₂; R stands for the substituent:

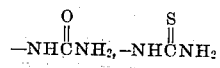

—OH, a saturated five-membered-mononitrogen heterocycle, a saturated five-membered-dinitrogen heterocycle or a saturated five-membered-mononitrogen-monooxygen heterocycle, each of which heterocycle contains at least one but not more than two carbonyl groups attached to the heterocyclic moiety; R' represents a six-membered nitrogen heterocycle, such as pyridyl or quinolyl; and R'' stands for the radical: —H or —COCH₃; as well as the acid addition or quaternary ammonium salt thereof.

Illustrative compounds which fall within the purview of the invention are: 2-[2-(5-nitro-2-thiazolyl)vinyl]pyridine, 2-nitro-5-thiazolecarboxaldehyde, 5-nitro-2-thiazolecarboxaldehyde, 3-{[ (5-nitro-2-thiazolyl)methylidene]amino{-2-oxazolidinone, 2-nitro-5-thiazolecarboxaldehyde, 3-{[(2-nitro-5-thiazolyl)methylidene]amino}-2-oxazolidinone, 2-nitro-5-thia-zolecarboxaldehyde thiosemicarbazone, 2-amino-5-(2-nitro-5-thiazolyl)-1,3,4-thiadiazole, 1-{[(2-nitro-5-thiazolyl)methylidene]amino}hydantoin, 1-{[(2-nitro-5-thiazolyl)methylidene]-amino -2-imidazolidinone, 2-nitro-5-thiazolecarboxaldehyde oxime, 4-[2-(5-nitro-2-thiazolyl)vinyl]pyridine, 2[2-(5-nitro-2-thiazolyl)vinyl]quinoline, 1-methyl-2-[2-(5-nitro-2-thiazolyl)vinyl]pyridinium iodide, 5-nitro-2-thiazolecarboxaldehyde thiosemicarbazone, 2-amino-5-(5-nitro-2-thiazolyl)-1,3,4-thiadiazole, 1-{[(5-nitro-2-thiazolyl)methylidene]amino}hydantoin, 1-{[(5-nitro-2-thiazolyl)methylidene]amino}-2-imidazolidinone, 5-nitro-2-thiazolecarboxaldehyde oxime, 5-nitro-2-thiazolecarboxaldehyde semicarbazone, and 2-acetamido-5-(5-nitro-2-thiazolyl)-1,3,4-thiadiazole.

In general, the above-illustrated compounds can be readily prepared from well-known intermediates. For instance, to prepare 5-nitro-2-thiazolecarboxaldehyde, 2-amino-5-nitrothiazole and alkali metal nitrite, such as sodium nitrite, are admixed in equimolar proportions in the presence of concentrated hydrochloric acid. The mixture is then initially cooled, usually to below about —50° C. and treated with about 1.5 moles of vinyl pyridine. There is then obtained 2-[2-(5-nitro-2-thiazolyl)vinyl]pyridine. When the latter is treated with ozone in the presence of a lower alkyl ester solvent, such as ethylacetate, 5-nitro-2-thiazolecarboxaldehyde is recovered in good yield.

The preparation of 5-nitro-2-thiazolecarboxaldehyde derivatives contemplated herein involves the reaction of the nitrothiazolecarboxaldehyde with an amine or methyl heterocyclic reactant, such as RNH₂ or R'CH₃, where R and R' are the same as hereinabove defined. In brief, when utilizing RCH₃ as the reactant, the nitrothiazolecarboxaldehyde is dissolved in an inert solvent therefor, such as alcohol, dioxane, or dimethylsulfoxide. To the solution is then added with stirring, catalytic quantities of zinc chloride, piperidine, or a strong mineral acid, together with the methyl heterocyclic reactant, such as 2- or 4-picoline or quinaldine. Where RNH₂ is the reactant, the latter amine reactant, such as hydroxylamine, semicarbazide, 3-amino-2-imidazolidinone, 3-amino-2-oxazolidinone, or thiosemicarbazide, is permitted to react with the nitrothiazole in an inert solvent, usually alcohol or aqueous alcohol. Advantageously, the reaction may be catalyzed by a small amount of mineral acid, such as hydrochloric acid. Usually, equimolar quantities of reactants but widely varying temperatures from about 0° to 100° C. can be employed for purposes of conducting the process of the invention.

The invention will be further exemplified by the following illustrative examples which are not to be taken as being limitative.

EXAMPLE 1

2-[2-(5-Nitro-2-thiazolyl)vinyl]pyridine Preparation

In a suitable reaction vessel one mole (145 grams) of 2-amino-5-nitrothiazole is slurried with 450 milliliters of concentrated hydrochloric acid and 100 milliliters of water and cooled to —70° C.; in one-half hour, 69 grams (1 mole) of sodium nitrite in 100 milliliters of water is added to give a pale green mixture. Subsequently, after 10 minutes of stirring, 160 grams (1.52 moles) of vinylpyridine in 600 milliliters acetone is added rapidly, keeping the temperature below —30° C. Then 28 grams of cupric chloride dihydrate is added and the mixture stirred 10 minutes before allowing it to rise to room temperature. At —10° C. the greenish mixture turns reddish and the vigorous evolution of nitrogen is noted. The mixture is stirred at room temperature until nitrogen evolution ceases. The latter is then added to half a liter of water. The mixture is neutralized with sodium bicarbonate, treated with methylene chloride (five pints), filtered and the organic phase separated. The aqueous phase or layer is further extracted with methylene chloride and the combined organic phases are combined and dried with magnesium sulfate. After filtering, the volatile liquids are removed from the filtrate in vacuo to give a viscous mixture which contains solid material.

The above prepared mixture is washed with methanol to give 25.3 grams of solid product, having a melting point between 178° C.–182° C. Evaporation of the mother liquors affords an additional six grams of product which begins to melt at 162° C. Purification of products by treatment of a chloroform solution with activated carbon affords 25.43 grams or 10.5 percent of yellow product. The pure product melts at between 181.5° C. and 183° C.

EXAMPLE 2

Preparation of 5-Nitro-2-thiazolecarboxaldehyde

Twelve grams (51.5 m moles) of 2-[2-(5-nitro-2-thiazolyl)vinyl]pyridine in 450 milliliters of ethylacetate is slurried at between —30° C. and —20° C. Ozone is introduced for one and one-half hours or until the yellow color disappears. Stirring is continued for an additional 10 minutes before the mixture is purged of ozone with nitrogen. The mixture is then treated with 9 grams of sodium iodide in 10 milliliters of glacial acetic acid and 100 milliliters of water at from —10° C. to 10° C. The iodine is reduced with 19 grams of sodium thiosulfate in 200 milliliters of water, the organic phase separated, and the aqueous layer extracted with 100 milliliters of ether.

The combined organic phases are washed three times with 10 percent hydrochloric acid followed by a washing with 50 milliliters of saturated sodium carbonate solution. The organic phase is dried with magnesium sulfate, filtered, and volatile solvents evaporated in vacuo to give a red-brown oil The oil is further treated with ether, filtered and evaporated in vacuo to yield 4.16 grams (51 percent) of aldehyde; = max. (C O) 1700 cm$^{-1}$, (C—H) 2900 cm$^{-1}$. The pure aldehyde melts at 50.5° C.

EXAMPLE 3

Preparation of 3-{[(5-Nitro-2-thiazolyl)methylidene]amino}-2-oxazolidinone 4.16 Grams of 5-nitro-2-thiazolecarboxaldehyde in 35 milliliters of ethanol is treated with 2.7 grams (26.4 m moles) of 3-amino-2-oxazolidinone and five drops of concentrated hydrochloric acid to give a yellow solid. The mixture is slurried, refluxed for 5 minutes, cooled, and the yellow product collected by filtration. The solid is washed with cold 2B ethanol and dried to give 5.52 grams (86.4 percent) of product, whose melting point is 221° C.–222° C.

EXAMPLE 4

Preparation of 4-[2-(5-Nitro-2-thiazolyl)vinyl]pyridine

In 15 milliliters of n-propanol with 0.5 milliliters of piperidine are placed 4.4 grams of 5-nitro-2-thiazolecarboxaldehyde and 1.3 grams of 4-picoline. The mixture is heated at reflux for one hour, cooled, and the solid collected by filtration. The material is recrystallized from methanol to give a yellow product, melting point 167° C. –169° C.

EXAMPLE 5

Preparation of 2-[2-(5-Nitro-2-thiazolyl)vinyl]quinoline

A mixture of 15.8 grams of 5-nitro-2-thiazolecarboxaldehyde and 7.2 grams of quinaldine in 100 milliliters of n-propanol and 2 milliliters of piperidine is heated at reflux for three hours. The resulting mixture is cooled in ice for one hour and the solid collected by filtration. The product is recrystallized from hot acetone, a process which affords yellow crystals melting at 208°–209° C.

EXAMPLE 6

Preparation of 1-Methyl-2-[2-(5-Nitro-2-thiazolyl)vinyl]-pyridinium iodide

In a glass pressure bottle fitted with a sealing cap is placed 5.0 grams of 2-[2-(5-nitro-2-thiazolyl)vinyl]pyridine and 100 grams of methyl iodide. The device is sealed and immersed for eight hours in an oil bath maintained at 100° C. The temperature of the oil bath is then raised to 145° C. for an additional eight hours. The device is removed from the bath, cooled, and the contents washed repeatedly with hot acetone until a yellow color is no longer present in the wash. The acetone insoluble product is dried in vacuo to give 7.3 grams (90 percent) of purple crystals melting at 241°–242° C.

EXAMPLE 7

Preparation of 5-Nitro-2-thiazolecarboxaldehyde thiosemicarbazone 3.3 Grams of thiosemicarbazide is dissolved in 60 milliliters of hot aqueous ethanol, and a solution of 5.7 grams of 5-nitro-2-thiazolecarboxaldehyde in 25 milliliters of ethanol is added. The resulting dark red solution is treated with two drops of concentrated aqueous hydrogen chloride, a process which causes the separation of a red crystalline solid. The mixture is cooled in ice for 30 minutes and the product collected by filtration. Recrystallization from a mixture of acetone and ethanol affords 7 grams of red crystalline product melting at 253°–254° C. with decomposition.

EXAMPLE 8

Preparation of 2-Amino-5-(5-nitro-2-thiazolyl)-1,3,4-thiadiazole

A mixture of 655 milligrams of 5-nitro-2-thiazolecarboxaldehyde thiosemicarbazone and 5.5 grams of ferric ammonium sulfate dodecahydrate in 10 milliliters of water is stirred and heated at 80°–90° C. for 2 hours. The mixture is cooled and filtered, a process which affords an orange solid. Recrystallization from a mixture of dimethylformamide and ethanol gives 350 milligrams of product melting at 249° C. with decomposition.

EXAMPLE 9

Preparation of 1-{[(5-Nitro-2-thiazolyl)methylidene]amino}-hydantoin

To a solution of 4.15 grams of 1-aminohydantoin hydrochloride in 50 milliliters of warm 70 percent aqueous ethanol is added a solution of 4.25 grams of 5-nitro-2-thiazolecarboxaldehyde in 20 milliliters of ethanol and the resulting mixture heated at reflux for 25 minutes. The reaction is cooled in ice for 30 minutes and the resulting solid collected by filtration. Recrystallization from aqueous ethanol and treatment with decolorizing carbon affords 1.5 grams of crystalline product melting at 144°–145° C.

EXAMPLE 10

Preparation of 1-{[(5-Nitro-2-thiazolyl)methylidene]amino}-2-imidazolidinone

To 10 milliliters of a solution containing 0.365 moles per liter of 1-amino-2-imidazolidinone, prepared in situ (through the nitrosation of 2-imidazolidinone with sodium nitrite in 2N sulfuric acid followed by reduction with powdered zinc), is added a solution of 275 milligrams of 5-nitro-2-thiazolecarboxaldehyde in 15 milliliters of ethanol. The solution is heated for 5 minutes on a steam bath, and ethanol or water is added until a homogeneous system is obtained. The solution is chilled in ice to afford a yellow crystalline solid. Recrystallization from a mixture of dimethylformamide and ethanol affords 400 milligrams of product melting at 256°–257° C. with decomposition.

EXAMPLE 11

Preparation of 5-Nitro-2-thiazolecarboxaldehyde oxime

A mixture of 3.6 grams of 5-nitro-2-thiazolecarboxaldehyde and 3.6 grams of hydroxylamine hydrochloride in 17 milliliters of absolute ethyl alcohol and 17 milliliters of pyridine is heated at reflux for 2 hours. The solvents are removed under reduced pressure and the residue treated with 20 milliliters of water. The solid thus obtained is collected by filtration and washed with 20 milliliters of cold water. The crude product is recrystallized from 200 milliliters of 50 percent aqueous ethanol by adding enough acetone to the hot mixture to solubilize the solid. Treatment with decolorizing carbon while in solution, filtering through celite, and chilling in ice affords 2.0 grams of crystalline product melting at 169°–170° C.

EXAMPLE 12

Preparation of 5-Nitro-2-thiazolecarboxaldehyde semicarbazone

To a solution containing 3.8 grams of 5-nitro-2-thiazolecarboxaldehyde in 30 milliliters of ethanol is added approximately 50 milliliters of water, the solution becoming turbid. To this solution is added 2.65 grams of semicarbazide hydrochloride and 1.98 grams of anhydrous sodium acetate. The resulting solution is heated at 90°–95° C. for 5 minutes. The solution is allowed to cool slowly, a process which causes the separation of a solid which is collected after 45 minutes and washed with water. The product is boiled for 35 minutes with 125 milliliters of ethanol, collected by filtration, and dried to give 4.4 grams of product melting at 284° C. with decomposition.

EXAMPLE 13

Preparation of 2-Acetamido-5-(5-nitro-2-thiazolyl)-1,3,4-thiadiazole

In 20 milliliters of acetic anhydride, 5 grams of 2-amino-5-(5-nitro-2-thiazolyl)-1,3,4-thiadiazole is heated at 100° C. for 10 minutes, the mixture cooled, and a solid product in good yield is collected.

EXAMPLE 14

Preparation of 2-Nitro-5-thiazolecarboxaldehyde

A solution containing 10.0 grams of 2-amino-5-thiazolecarboxaldehyde in 20 percent fluoboric acid is maintained at 40°–60° C. in a heated addition funnel while being added dropwise over 45 minutes to a suspension of 5.0 grams copper metal powder in 100 milliliters of 23 percent aqueous sodium nitrite solution at 25° C. During the addition, and for a short time thereafter, the reaction mixture evolves gases. The mixture is allowed to stir for 2 hours, filtered to remove some red solid and residual copper, and the filtrate extracted three times with 200 milliliters of benzene. The extracts are combined and dried over magnesium sulfate. After filtration to remove the drying agent, the benzene is evaporated under vacuum to give 6.0 grams of product as a yellow oil which slowly crystallizes to a yellow solid melting at 78°–81° C.

EXAMPLE 15

Preparation of 3-{[(2-Nitro-5-thiazolyl)methylidene]amino}-2-oxazolidinone

The procedure of Example 3 is followed in every respect except that 4.1 grams of 2-nitro-5-thiazolecarboxaldehyde and 3.0 grams of 3-amino-2-oxazolidinone are employed to prepare 5.4 grams of crystalline product which melts at 253°–255° C.

EXAMPLE 16

Preparation of 2-Nitro-5-thiazolecarboxaldehyde thiosemicarbazone

The procedure of Example 7 is followed in every respect except that 4.1 grams of 2-nitro-5-thiazolecarboxaldehyde and 2.75 grams of thiosemicarbazide are reacted to obtain 3.4 grams of 2-nitro-5-thiazolecarboxaldehyde which melts above 300° C.

EXAMPLE 17

Preparation of 2-Amino-5-(2-nitro-5-thiazolyl)-1,3,4-thiadiazole

A mixture of 4.6 grams of 2-nitro-5-thiazolecarboxaldehyde thiosemicarbazone, 40 milliliters of dimethylformamide, and 40 milliliters of 25 percent aqueous ferric chloride solution is stirred and heated at 100° C. for 2 hours. Stirring is continued at 25° C. for 17 hours. The mixture is treated with 100 milliliters of water, and a brown solid is obtained. This material is placed in a Soxhlet extractor and extracted with acetone until color is no longer removed from the solid. The acetone is treated with decolorizing carbon and evaporated to give 4.4 grams of orange product melting above 300° C.

EXAMPLE 18

Preparation of 1-{[(2-Nitro-5-thiazolyl)methylidene]amino}-hydantoin

The procedure of Example 9 is followed except that 4.75 grams of 2-nitro-5-thiazolecarboxaldehyde and 5.0 grams of 1-amino-hydantoin are used. The crystalline product melts at 239°–240° C. and weighs 4.4 grams.

EXAMPLE 19

Preparation of 1-{[(2-Nitro-5-thiazolyl)methylidene]amino}-2-imidazolidinone

The procedure of Example 10 is followed except that 3.0 grams of 2-nitro-5-thiazolecarboxaldehyde and 110 milliliters of 1-amino-2-imidazolidinone solution are used. The red crystalline product weighs 4.4 grams and melts at 252°–254° C.

EXAMPLE 20

Preparation of 2-Nitro-5-thiazolecarboxaldehyde Oxime

The procedure of Example 11 is followed except that 2-nitro-5-thiazolecarboxaldehyde is used instead of 5-nitro-2-thiazolecarboxaldehyde. The product obtained after two recrystallizations from aqueous alcohol is an orange powder melting at 127°–134° C.

Advantageously, as is demonstrated in the examples below, the novel compounds of the present invention can be incorporated in a variety of suitable carriers or diluents. In general, the compounds possess enhanced bacteriotoxic and fungitoxic properties even in extremely dilute concentrations. They also possess good herbicidal and nematocidal properties. In this respect, less than 0.01 percent and usually from 0.001 percent to 0.005 percent of the active compound is employed to obtain 100 percent kill of bacteria or fungi. Further, the compositions of the invention can be prepared as a solution by dissolving an active compound in a water and acetone or alcohol mixture. Alternatively, suitable compositions can be prepared either as a suspension in a non-solvent, or as a dust. Suspensions or dispersions of the thiazole compound in a carrier, such as water, are useful in the treatment of plant foliage. If desired, the fungicidal compound can be conveniently applied to foliage by dissolving the compound in a highly volatile liquid carrier, such as dichlorodifluoromethane, maintained under pressure. If desired, the active compound can be dissolved in a less volatile solvent, such as benzene, and the solution can be further admixed with a highly volatile liquid carrier under ambient pressures.

For some applications, dusts will be required. These can be prepared by mixing the active compounds with materials, such as clay, fuller's earth, bentonite and pumice. In this manner, seed can be protected from soil microorganisms by incorporating the active compound in a solid carrier, while tumbling seeds with the composition.

The compositions herein may include advantageously any compatible commercially available dispersing agent for the active compound of the invention, particularly when the latter is employed as an aqueous suspension. Illustrative of such dispersing or surface-active agents are the fatty acid esters of polyhydric alcohol, the sodium salt of polymerized propyl naphthalene, sulfonic acid and the ethylene oxide condensates of alkylaryl polyether alcohols. It is a good practice to employ from 1 to 5 parts per 100 parts of the active compound.

EXAMPLE 21

In this example, the antibacterial activity of the compounds of the instant invention is demonstrated.

Representative compounds are dissolved or suspended in aqueous solution in sufficient amount to provide a concentration of 100 ppm of test compound in said solution. Three test organisms, gram negative *Aerobacter aerogenes*, a common inhabitant of soils and water; gram positive *Staphylococcus aureus*, found on the skins of humans and animals; and gram negative *Xanthomonas vesicatoria*, a pathogen which incites bacteriosis of tomatoes and peppers are used as the test organisms.

Nine milliliters of deionized water is introduced into a plurality of test tubes to be used for evaluation and the tubes are capped and sterilized. For each test compound employed, 1 milliliter of stock solution is added to each of three test tubes resulting in a test concentration of 100 ppm per tube. One drop of a bacterial cell suspension is then added to the appropriate tube. The bacterial cell suspensions are taken from 24-hour broth cultures which have been inoculated with bacteria from 7-day Nutrient Agar slants. After inoculation, the tubes are permitted to stand at room temperature for 24 hours, then placed in an incubation cabinet for an additional 24 hours at 37° C., then examined and turbidity readings taken. The tubes are rated according to the following index:

0 = no effect
9 = kill of bacteria

5 = stasis. with no kill of all bacteria

The results of these tests are reported in Table I below which shows the markedly effective antibacterial action of typical compounds of the invention against the organisms named. However, the compounds of the invention exhibit also marked activity against a wide variety of gram positive and gram negative bacteria which are causal agents of disease in man and lower animals. Further, the compounds of the invention are found to be effective against protozoa, such as *Trichomonas vaginalis*.

TABLE I

| Structure of test Compound | Antibacterial activity [1] | | |
|---|---|---|---|
| | A.a. | S.a. | X.v. |
| | Concentration (p.p.m.) | | |
| | 100 | 100 | 100 |
| O₂N—[thiazole]—C(H)=N—N—[morpholinone] | 9 | 9 | 9 |
| O₂N—[thiazole]—CH=CH—[pyridinium-CH₃⁺ I⁻] | 5 | 5 | 5 |
| O₂N—[thiazole]—CH=N—N—[ring with NH] | 9 | 9 | 9 |
| O₂N—[thiazole]—CH=N—N—[ring with NH,O] | 9 | 9 | 9 |
| O₂N—[thiazole]—[thiazole]—NH₂ | 0 | 9 | 9 |
| O₂N—[thiazole]—CH=H—OH | 9 | 9 | 9 |
| [thiazole]—NO₂ / C=N—N—[ring with O] | 9 | 5 | 9 |
| [thiazole]—NO₂ / CH=N—N—[ring with NH,O] | 0 | 0 | 9 |

[1] A.a. = *Aerobacter aerogenes*; S.a. = *Staphylococcus aureus*; X.v. = *Xanthomonas vesicatoria*.

EXAMPLE 22

The fungicidal activity of the compounds of the instant invention is demonstrated by the following tests wherein representative compounds are tested at a concentration of 100 ppm of active ingredient against three organisms: *Monilinia fructicola*, the pathogen which incites American brown rot of stone fruits; *Stemphylium sarcinaeforme*, the pathogen responsible for leaf spot on certain legumes; and *Aspergillus niger*, a saprophyte responsible for degradation of textiles, fabrics, leathers, vegetables and other organic materials.

In the test, spores from the separate cultures of the above-identified organisms are washed with deionized water and filtered to remove pieces of mycelium. Two milliliters of orange juice are added per liter of spore suspension to facilitate germ suspension. For each fungus species in test, a small amount of spore suspension plus a sufficient amount of stock solution of test compound are added to individual "opticlear" vials. The amount of stock solution employed is sufficient to provide approximately 100 ppm of active ingredient in the mixture of spore suspension and stock solution. The vials are stoppered, placed on a tumbler, and rotated for 24 hours to provide positive contact of the test compound and the test organism. At the end of the 24-hour exposure period, the suspensions are examined macroscopically and the percent inhabitation of spore germination recorded.

The results of these tests appear in Table II below.

TABLE II

| Structure of test compound | Percent inhibition of spore germination | | |
|---|---|---|---|
| | Monilinia fructicola | Stemphylium sarcinaeforme | Aspergillus niger |
| | Concentration (p.p.m.) | | |
| | 100 | 100 | 100 |
| O₂N—[thiazole]—C(H)=N—N—[morpholinone] | 100 | 100 | 100 |
| O₂N—[thiazole]—CH=N—OH | 95 | 0 | 100 |
| [thiazole]—NO₂ / C(H)=N—N—[ring with NH,O] | 100 | 0 | 100 |

EXAMPLE 23

The nematocidal activity of the compounds of the instant invention are exemplified by the following tests, wherein representative compounds are tested at a 1000 ppm concentration against the vinegar eelworm, *Turbatrix aceti*.

In these tests an aqueous suspension containing approximately 100 nematodes is placed in a number of small jars and a sufficient amount of test compound added to each to provide a concentration of approximately 1000 ppm of test compound in each mixture. The jars are placed on a tumbler and rotated for 24 hours, then examined macroscopically to determine the percent mortality achieved. The results of these tests are provided below.

TABLE III

| Structure of test compound | Percent kill of nematodes, Turbatrix aceti concentration (p.p.m.) 1,000 |
|---|---|
| $O_2N-\text{[thiazole]}-CH=CH-\text{[pyridine]}$ | 100 |
| $O_2N-\text{[thiazole]}-CH=CH-\text{[pyridine-N-CH}_3^\oplus I^\ominus]$ | 100 |
| $O_2N-\text{[thiazole]}-CH=N-OH$ | 100 |

EXAMPLE 24

The herbicidal activity of the compounds of the instant invention is shown by the following tests wherein a 1.5 percent Difco-Bacto agar containing 500 ppm or 100 ppm of test compound is poured into small bottles and permitted to solidify. After solidification, seeds of wheat, radish, cucumber and corn are individually placed on the surface of the solidified agar. A small amount of water is added to each bottle and the bottles are covered with glass plates for 48 hours to prevent or minimize the escape of volatile chemicals in the test. After 48 hours, the glass plates are removed and the bottles covered with Kraft paper. The seeds and plants are observed periodically following treatment and water is added as required. At the end of the 3-week test period, all bottles in test are examined and rated according to the phytotoxicity index provided below.

The results of the tests are provided in Table IV below.

TABLE IV

| Structure of test compound | Phytotoxicity of— | | | | | | | |
|---|---|---|---|---|---|---|---|---|
| | Wheat | | Radish | | Cucumber | | Corn | |
| | Concentration (p.p.m.) | | | | | | | |
| | 500 | 100 | 500 | 100 | 500 | 100 | 500 | 100 |
| $O_2N$-[thiazole]-C(H)=N-N-[oxazolidinone] | 7 | 7 | 9 | 9 | 7 | 7 | 0 | 7 |
| $O_2N$-[thiazole]-CH=CH-[pyridine] | 7 | | 7 | | 7 | | 7 | |
| $O_2N$-[thiazole]-CH=CH-[pyridine-N-CH$_3^\oplus$I$^\ominus$] | 7 | 0 | | | 5 | 0 | 7 | 0 |
| $O_2N$-[thiazole]-CH=N-N-[pyrrolidine-NH] | 6 | 6 | 9 | 9 | 7 | 7 | 7 | 7 |
| $O_2N$-[thiazole]-CH=N-N-[pyrrolidinedione-NH] | 7 | 7 | 9 | 7 | 7 | 7 | 8 | 0 |
| $O_2N$-[thiazole-N-thiazole]-NH$_2$ | 9 | 7 | 9 | 9 | 6 | 7 | 7 | 7 |
| $O_2N$-[thiazole]-CH=N-OH | 9 | 5 | 9 | 6 | 9 | 9 | 6 | 7 |
| [thiazole]-NO$_2$, C=N-N-[ring]-NH, H, O | 9 | | 9 | | 9 | | 9 | |

TABLE IV

| Structure of test compound | Phytotoxicity of— | | | | | | | |
|---|---|---|---|---|---|---|---|---|
| | Wheat | | Radish | | Cucumber | | Corn | |
| | Concentration (p.p.m.) | | | | | | | |
| | 500 | 100 | 500 | 100 | 500 | 100 | 500 | 100 |
| 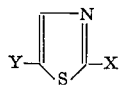<br>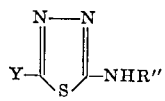 | 9 | | 9 | | 9 | | 9 | |

NOTE.—Phytotoxicity index: 0=Normal, like check; 9=Seed dead; 8=Plant dead; 7=Roots dead; 6=Blind germination; 5=Germinate, grow, then die; 4=Leaf malformation; 3=Chlorosis; 2=Suppressed growth, 1=Elongated stems.

We claim:

1. A 2,5-disubstituted thiazole of the formula:

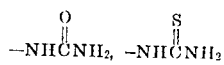

where X and Y each represents

Y—[thiazole]—NHR''

—NO₂, or —CH = NR, provided that X or Y is a —NO₂ substituent and the other substituent, but not both, is one other than —NO₂, and where R represents $$-NHCNH_2,\ -NH\overset{S}{\underset{\parallel}{C}}NH_2$$

—OH,

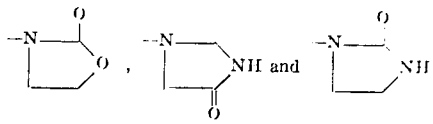

[a saturated 5-membered-mononitrogen heterocyclic, a saturated 5-membered-dinitrogen heterocyclic, a saturated 5-membered-mononitrogen-monooxygen heterocyclic, each of said heterocyclics containing at least one but not more than two carbonyl groups in the heterocyclic moiety, wherein each of said heterocyclics is bound at the ring nitrogen;] and R'' stands for —H or —COCH₃.

2. The compound according to claim 1: 3-{[(5-nitro-2-thiazolyl)methylidene]amino}-2-oxazolidinone.

3. The compound according to claim 1: 2-amino-5-(5-nitro-2-thiazolyl)-1,3,4-thiadiazole.

4. The compound according to claim 1: 1-{[(5-nitro-2-thiazolyl)methylidene]amino}-2imidazolidinone.

* * * * *

UNITED STATES PATENT OFFICE
CERTIFICATE OF CORRECTION

Patent No. 3,674,780         Dated   July 4, 1972

Inventor(s) Gerald Berkelhammer, Goro Asato and Edward Leslie Moon

It is certified that error appears in the above-identified patent and that said Letters Patent are hereby corrected as shown below:

Column 12, lines 26-31, the following should be deleted:

[a saturated 5-membered-mononitrogen heterocyclic, a saturated 5-membered-dinitrogen heterocyclic, a saturated 5-membered-mononitrogen-monooxygen heterocyclic, each of said heterocyclics containing at least one but not more than two carbonyl groups in the heterocyclic moiety, wherein each of said heterocyclics is bound at the ring nitrogen;]

Signed and sealed this 5th day of December 1972.

(SEAL)
Attest:

EDWARD M.FLETCHER,JR.
Attesting Officer

ROBERT GOTTSCHALK
Commissioner of Patents